J. FRISCH.
Kitchen Implement.
No. 82,615. Patented Sept. 29, 1868.
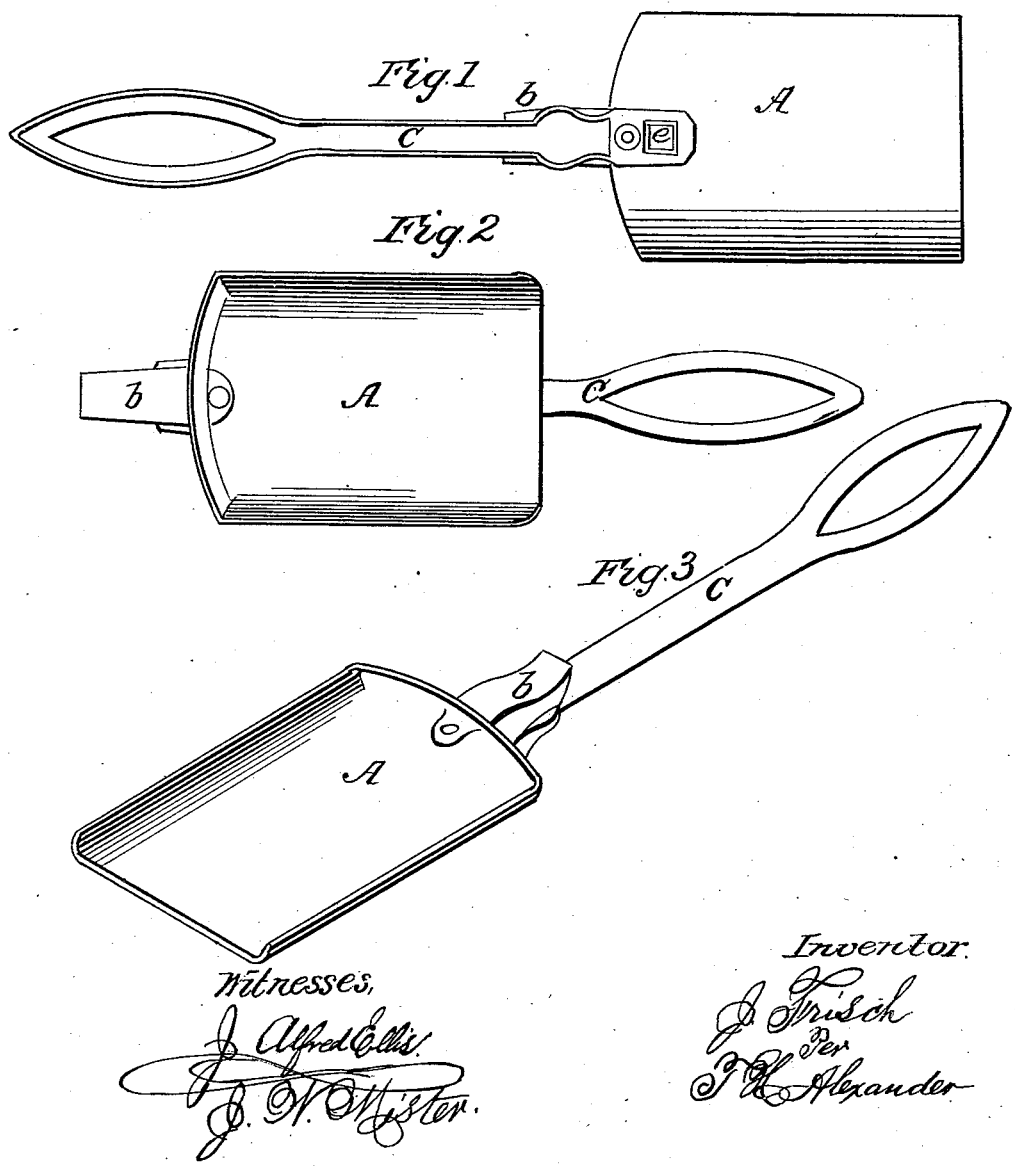

United States Patent Office.

JOHN FRISCH, OF ALBANY, NEW YORK.

Letters Patent No. 82,615, dated September 29, 1868.

IMPROVED KITCHEN-IMPLEMENT.

The Schedule referred to in these Letters Patent and making part of the same.

TO ALL WHOM IT MAY CONCERN:

Be it known that I, JOHN FRISCH, of Albany, in the county of Albany, and State of New York, have invented a certain new and useful Combined Shovel, Stove-Lifter, and Shaker; and I do hereby declare that the following is a full, clear, and exact description thereof, reference being had to the accompanying drawings, and to the letters of reference marked thereon, which form a part of this specification, in which—

Figure 1 is a plan of the under side of the shovel, exhibiting the wrench.

Figure 2, a plan of the front side, with the shovel turned so as to bring the stove-lifter in play; and Figure 3, a perspective view, showing the entire front side.

The object of my invention is to combine with a shovel several other implements or devices in common use, thus providing a new article of manufacture, possessing both utility and convenience.

To enable others skilled in the art to make and use my invention, I will now describe its construction and operation.

In the accompanying drawings—

A represents a shovel, which is cast or furnished with the projection $b$. This projection is designed to act as a stove-lifter when the handle is turned back, as seen in fig. 2.

C represents the handle, which is pivoted to the shovel at the rear of the projection $b$, so as to admit of its being turned back when the lifter is to be called into requisition.

$e$ represents a wrench, formed at the lower end of the handle C, which will be found convenient in tightening up the nuts on a stove or elsewhere.

What I claim, and desire to secure by Letters Patent, is—

The shovel A, furnished with a stove-lifter at its rear end, and having its handle, C, pivoted, as and for the purpose set forth.

In testimony that I claim the foregoing as my own, I affix my signature in presence of two witnesses.

JOHN FRISCH.

Witnesses:
M. THOLL,
P. TOLLMANN.